W. F. FOX.
PHOTOGRAPHIC PROCESS.
APPLICATION FILED DEC. 17, 1913.
1,187,421.
Patented June 13, 1916.
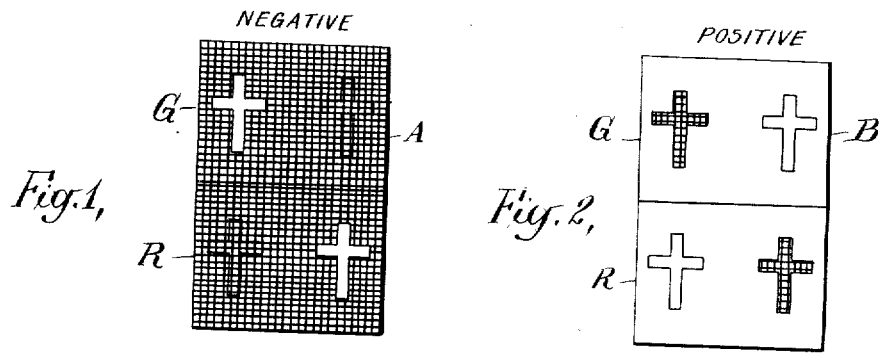
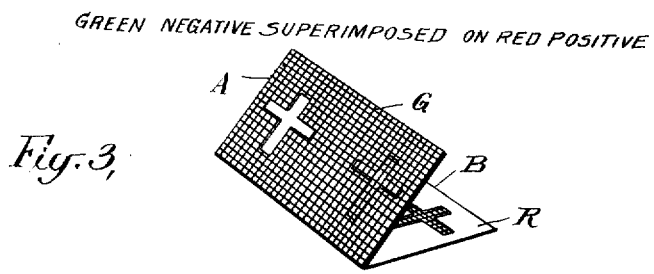
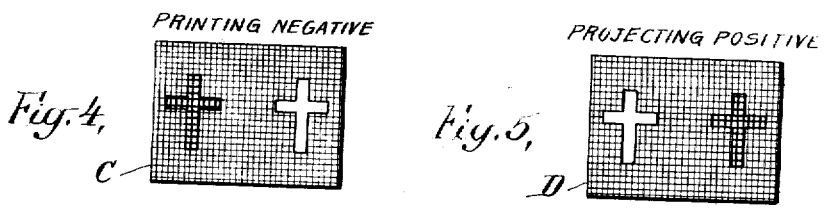
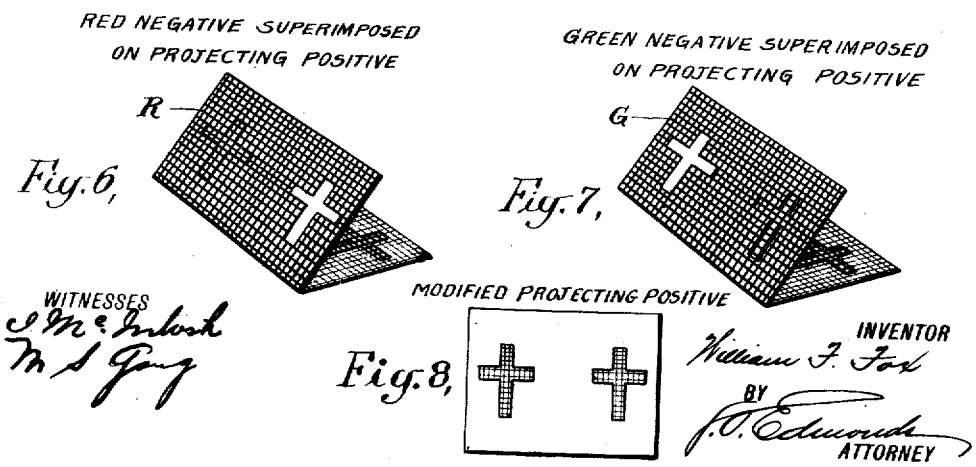

UNITED STATES PATENT OFFICE.

WILLIAM F. FOX, OF NEW YORK, N. Y., ASSIGNOR, BY DIRECT AND MESNE ASSIGNMENTS, TO KINEMACOLOR COMPANY OF AMERICA, OF NEW YORK, N. Y., A CORPORATION OF DELAWARE.

PHOTOGRAPHIC PROCESS.

1,187,421.  Specification of Letters Patent.  Patented June 13, 1916.

Application filed December 17, 1913. Serial No. 807,172.

*To all whom it may concern:*

Be it known that I, WILLIAM FRANCIS FOX, a subject of the King of Great Britain, residing in the borough of Manhattan, city, county, and State of New York, have invented certain new and useful Improvements in Photographic Processes, of which the following is a specification.

The invention relates broadly to the production of photographs in colors approximating those of nature, but is particularly well adapted for use in colored moving-picture projection, being in this respect an improvement upon methods and apparatus heretofore employed, whereby colored photographs are, by means of a suitable consecutive-view machine, projected on a large scale upon a screen.

In the art of colored moving-picture projection as practised at the present time, a negative film is first produced by means of a suitable consecutive-camera. This film, coated with panchromatic emulsion, is exposed through color screens or filters, one image being taken through a green filter and the next adjacent image through a red filter. When developed and fixed, this negative film has the appearance of the ordinary monochrome or "black and white" film. For the purpose of reproducing the images thereon, a positive is made from the negative film, and this is threaded in a suitable consecutive-view projecting machine, which, like the camera above referred to, is provided also with color screens or filters (green and red), which are brought into the line of projection, opposite the aperture of the machine, alternately and in synchronism with the images on the film. Due to the high speed of movement of the filters and film, and to the phenomenon known as "persistence of vision", the images, superimposed, are thereby projected upon the screen on enlarged scale and in substantially natural colors.

Under my invention, the use of color screens in projecting the pictures is entirely dispensed with, the colors being a part of the film itself, so that in projecting, the enlarged moving-picture thrown upon the screen (as by means of the ordinary projecting machine used in "black and white" projection) represents the true colors of the scene or other subject-matter originally photographed.

It is a well known fact that the silver deposit upon a photographic print can be changed to practically any color by toning. It is also equally well known that gelatin emulsion can be dyed. Ordinarily upon dyeing such a print, all portions of the gelatin will take up the dye equally, and even should the black portion of the film have been toned to a different color, there will be a mixing of the colors which will degrade both the tints used, neither color showing properly. The print may, however, be treated chemically, as a result of which not only will the black silver-deposit be turned green, but the gelatin will be so affected as that if the print be immersed in a dye bath, such gelatin will take up dye in inverse proportion to the amount of the silver-deposit which has been turned green. For example, a print containing a portion represented by clear gelatin, another portion represented by gray deposit, and another portion by black deposit, after being toned will give the following results:—The black deposit will be turned dark green, the gray will be turned a lighter green and the clear portion will not be affected at all as to color. Due to the acid contained in the toning bath, however, an action has taken place in the gelatin itself, hardening that portion which has been exposed to light (*i. e.*, the black portion) but leaving in its original state the gelatin which has not been so exposed (*i. e.*, the clear portion.) If, now, the print be immersed in a red dye, the clear portion will take up the maximum quantity of such dye, the light green portion will take up a less quantity of the dye, and the dark green portion will take up substantially no dye. As a result, in the toned and tinted print, the clear portion will be red, the dark portion will be green, and the lighter green portion will be white (or nearly so), this being the result of the combined colors red and green. Such a result, of course, is unnatural, since the reproduction of the natural colors would require that the clear portion of the picture be white, instead of red.

Now, if two photographic images be taken upon a panchromatic plate or film, one through a red screen or filter and the other through a green screen or filter, in the negative image taken through the red screen the red portions of the object portrayed will be black, the white portions will be black, and the green portions will be clear. In the negative image taken through the green screen or filter, the red portions will be clear, the white portions black, and the green portions black. Obviously in a positive reproduction from each image the conditions here stated will be reversed. Of these four picture-bearing devices (two negatives and two positives) two, i. e., the green negative and the red positive, will present the proper conditions for toning and dyeing so far as concerns those portions of the object photographed which were red and green, but not as to those portions which were white. If either the green negative or the red positive were toned and dyed, both the reds and greens would be properly reproduced, but in the negative the portion which should be white would be green and in the positive the portion which should be white would be red. If, however, the red negative and the green positive be superimposed and a print taken therefrom, the required results will be obtained, since the reds will be clear, (there being, in the superimposed images, two thicknesses of silver deposit representing that color, and consequently practically no exposure therethrough), the whites will be gray, (there being, in said images, but one thickness of silver deposit through which exposure is made), and the greens will be black, (there being, in said images, substantially no silver deposit representing that color). Therefore, to obtain a positive print suitable for coloring, it is essential to superimpose, and to obtain a print from, a positive of one color and a negative of the other color, in order to get the correct color gradation.

Such a positive print as that last referred to can be toned and dyed, and so made to reproduce substantially natural colors, but if a large number of such prints be required, it is preferable to use for this purpose what I term a "printing negative". This may be obtained by superimposing the green negative and the red positive and printing through the same, the result being, on the underlying surface, an image in which the color gradations are reversed. A positive print made from such a printing negative may then be colored in the manner heretofore indicated. After this has been done, all portions represented by silver deposit will be green, while all clear portions will be red, and there will be an absence of the grading or merging of these colors necessary to reproduce the hues of the object originally photographed. This leads to the necessity of printing a black and white impression of the same picture over the image upon the positive, in order to correct the coloring of the latter and give the necessary brilliancy thereto. Since white is the most brilliant portion of a picture, it should be the clearest portion of the positive. Other colors, light or dark, must be supplied as in the object originally photographed. Therefore, for the production of the (superimposed) black and white impression upon the color picture, the original negatives (one made through a red screen and the other through a green screen) may be used, a print from each being superimposed over the print upon the projecting positive which has been, or is to be, colored, the exposure of each of said negatives being one-half that normally required, so that the successive exposure of both shall give an impression of normal intensity. As a result, in the impression thus made upon the projecting positive (and which I term the "correcting image"), the whites will be clear (there being no exposure from either negative), the reds and greens and other colors of the original object will be slightly darker (depending, of course, on the intensity of these colors in such object), and the blacks will be black. The "projecting positive" will thus bear two images (either on one side or on both sides of the film, as presently explained), one of these being in color and the other in monochrome, both being in precise register and the combination of the two giving substantially correct color values. It may be observed that since but two colors have been employed, it will be desirable, in the coloring step, to use, instead of a pure green, a somewhat bluish green; as a result, blue-violet color in the object photographed is not missed, the two primary colors, modified as here indicated, doing the work of three, the object being reproduced in substantially the colors which characterized it.

In carrying out the invention, for the particular purpose selected for this disclosure, I first photograph the subject by means of a camera employing the green and red filters above referred to, as in the production of negatives by the "Kinemacolor" process. As a result of the rapid movement of the film and correspondingly rapid alternation of the green and red filters, each two adjacent images upon the film will differ in the respect that one, photographed through the green filter, will contain no red sensations, while the other, photographed through the red filter, will contain no green sensations. A positive print from such a negative would be suitable for the production of colored moving-pictures if projected through green and red filters, as above stated. Instead, however, I utilize this negative only indirectly in the production of the projecting positive, so that the latter may be utilized for the projection of colored pictures in an ordinary projecting apparatus employing no filters. In so doing, after developing and toning the negative, I print therefrom a positive, and this positive I then combine with the negative by placing both films in juxtaposition, having shifted the same longitudinally, however, so that what may be termed a green image on the negative is directly superimposed over what may be termed a red image on the positive. I use "green image" to mean the image taken through a green filter and "red image" to mean the image taken through a red filter. Then, from this combination of negative and positive film, I produce a printing negative. In so doing, I omit alternate images on the combined negative and positive, and print the images upon the printing negative closely adjacent to each other as in the original negative. In this way I produce a printing negative which contains but one-half the total number of images and is, therefore, but one-half the length of the original negative and the positive made therefrom. Each image upon the printing negative will have both the green and the red color values, due to the superimposition of images upon the original negative and the positive thereof, as above explained.

From the printing negative, I produce a positive print suitable for projecting purposes. This, after development in the usual manner, is treated by means of dyes of green and red color, with the result that when toned each image will represent the color sensations of the original subject, minus, however, the necessary color gradations. To finish the film, I then coat with emulsion the reverse surface thereof, or, if desired, varnish the originally emulsioned surface, and over the varnish re-emulsion said surface. On the emulsioned or re-emulsioned surface so obtained, I make a second print of each image, not, however, from the printing negative above referred to but from the original negative, using, for the over-printing upon each image of the projecting positive, first the corresponding green image, and then the next adjacent red image, of such original negative. After this operation, the projecting positive film is developed in the usual manner. The images formed in this way, on what I term the projecting positive, coinciding precisely with those formed thereon from the printing negative, and the intermediate dyeing step as above described, result in the production of images employing substantially the natural colors of the subject originally photographed. The passage of light through the projecting positive so formed makes it possible, therefore, to project upon a screen either a single image or a succession of images, all in natural color, and this without the intervention of color filters or screens now employed in the "Kinemacolor" process.

As a preferred method of procedure, which, however, may be departed from in various respects, I attain the result above stated by means of the following steps, reference being had to the accompanying drawing, the figures of which are conventionalized, for the purpose of aiding in the following disclosure.

Figures 1 and 2 are plan views, respectively, of a negative film and a positive film made therefrom, the objects photographed in these and the other figures being two crosses, one red and the other green, against a white background, the red cross being that at the left; Fig. 3 is a perspective view, illustrating the green negative of Fig. 1, superimposed upon the red positive of Fig. 2; Fig. 4 is a plan view of the "printing negative"; Fig. 5, a similar view of the projecting positive; Fig. 6, a perspective view, showing the red negative (Fig. 1) superimposed ready for printing upon the projecting positive (Fig. 5); Fig. 7 is a similar view, showing the green negative (Fig. 1) superimposed ready for printing upon the projecting positive (Fig. 5); and Fig. 8 is a plan view of the projecting positive as modified by the printing steps indicated by Figs. 6 and 7.

First, by suitable means, such, for example, as a kinemacolor camera, as above referred to, I obtain a negative (A, Fig. 1), the successive images thereon having been obtained by successive exposures alternately through green and red filters, such images being represented on said figure by the letters G and R, the difference between the two being that what I herein term the "green images" contain no red color sensations, while what I term the "red images" contain no green color sensations. This negative film is then developed and fixed in the usual manner. Next, from the negative film A I produce, either in the usual or any other desired manner, a positive print (B, Fig. 2), this, after developing and fixing, being the projecting positive commonly used in color-picture projection by means of a consecutive-view projecting machine employing green and red filters. Instead, however, of using this positive film B for the purpose of projection, I combine the same with the original negative A, preferably by superimposing the same, one being moved a step relatively to the other, so as to result in the superimposition of a green image of the negative film A upon a red image of the positive film B, this being illustrated in Fig. 3. From the combination so formed, I produce in any suitable manner what I term a printing negative, C. This may be accomplished either by the projection of light through the combined films A and B, or else by means of an optical printer, in manner well understood. All of the images upon the combined films A and B, however, are not used in this operation, but only the alternate images, and this may be accomplished in any suitable manner, a simple way involving merely the movement of the combined films A and B two steps to one step of the film which is being transposed into the printing negative. As will be understood, each image thus formed upon the printing negative C is a combination of two images (one green and one red) of the combined negative and positive films A and B. Also, as will be obvious, since only the alternate images of the combined films A and B have been used, the images upon the printing negative C will be but one-half in number, and the printing negative itself will be but one-half the length of the films A and B.

It now remains to utilize the printing negative C in the production of a projecting positive, which is effected in the following manner. By any suitable process, such as either of those heretofore referred to, a projecting positive D (Fig. 5) is made from the printing negative C, all of the images upon the latter being impressed upon said positive and said positive being, therefore, a reproduction of the negative as a whole, save that the images are in positive rather than in negative form. The positive D is then developed, fixed and dried, after which the images appear thereon in monochrome, as is usual in positive pictures of this general character.

The film is next subjected to the coloring step, involving immersing the same in color, and this I prefer to do by the application of two colors successively rather than simultaneously. It is first necessary that the silver deposit upon the film shall be made to take up an acid dye. This is accomplished by immersing the film in a bath of a solution of vanadium chlorid and iron, which changes the image to a green color. The film is then preferably washed and immersed in a bath of sodium thiosulfate, again washed and immersed in a tinting bath of red, and for this purpose any of the usual red anilin dyes may be employed. During this immersion, the gelatin upon the film will take up the anilin red dye, as previously stated, in inverse proportion to the amount of the silver deposit which has been turned green, so that portions of the film which contained a black silver deposit, turned dark green by the toning bath, will take up substantially none of the anilin red, portions which contained a gray deposit, turned a lighter green by the toning, will take up a certain amount of the red, and portions of the film which were not acted upon by the green bath at all will absorb and retain the maximum quantity of red dye.

After immersion in the tinting bath, the film may be again washed to remove surplus color, after which it is dried in any suitable manner.

As a result of the steps just described, the image upon the projecting positive is colored with both of the primary colors referred to, but is imperfect by reason of the lack of gradation of such colors. This defect of the film is corrected by the subsequent printing step, which I now proceed to describe.

The originally emulsioned surface of the positive film having been utilized as above pointed out, it is desirable to form a new emulsioned surface thereon, and this may be done either by applying the emulsion to the reverse side of the film or, if preferred, by varnishing the previously emulsioned surface and then re-emulsioning that surface over the varnish. If the emulsion be applied to the reverse side of the film, it is of course, desirable to waterproof the original emulsioned surface, in order that the same may not be injured during the process of developing images upon the reverse (emulsified) surface. Regardless of which practice be followed, the subsequent procedure will be the same. Using preferably the original negative and being careful that the images thereon are successively brought into precise registration with the images on the projecting positive, I next print upon the latter, (Figs. 6 and 7) first a red print of the original negative, and then a green print of such original negative, this printing being effected in the manner heretofore indicated. I observe at this point that this operation of printing should be so conducted as that the successive printing images of the negative and the corresponding images of the projecting positive should be brought into precise registration during the printing operation, to avoid blurring or lack of definition. As a result (Fig. 8) of this superimposition of both a green image and a red image upon the (colored) combined red and green image of the projecting positive, the coloring of the latter is corrected with respect to the gradation of color, such colors being thereby caused to blend into each other and color too pronounced being toned down. After this operation, it is only necessary to develop and fix the projecting positive (with respect only, of course, to the re-emulsioned surface which has thus been printed upon), after which such positive is ready for exhibition in a suitable projecting machine. Also, it will be seen that since the true colors of the subject-matter originally photographed are now represented in what I have termed the projecting positive, the projection of pictures by means of the latter is wholly independent of the use of color-screens, such as heretofore referred to, it being only necessary to pass the projecting positive through an ordinary projecting machine, the images being successively displaced, and to project a beam of light therethrough, whereupon the reproduction of said subject-matter, and in its original colors, will be thrown upon the screen.

I wish it to be understood that the reference herein to the process of producing photographs for moving-picture projection purposes has been made solely for the purpose of benefiting the description and disclosing one method of commercially utilizing this invention. The invention itself, however, is of broader scope, being, as heretofore indicated, applicable to photography for other and entirely different purposes.

Having now described my invention, what I claim as new therein and desire to secure by Letters Patent is as follows:—

1. A photographic process comprising the production of two negatives of an object, from one of which red color sensations have been omitted and from the other of which green color sensations have been omitted, obtaining positive prints of said negatives, superimposing one of said negatives upon the positive corresponding to the other negative, and producing thereby a printing negative, obtaining a print from said printing negative, treating said print in a bath adapted to cause the silver deposit on the print to assume a green color, of an intensity proportional to the strength of the deposit, and to affect the emulsion of the print, in direct proportion to the extent to which it has been exposed to light, and treating the print with a bath adapted to impart a red color thereto, in inverse proportion to the extent to which the emulsion thereof has been affected by said first bath, substantially as set forth.

2. A photographic process comprising the production of two negatives of an object, from one of which certain color sensations have been omitted, and from the other of which certain other complementary sensations have been omitted, obtaining positive prints of said negatives, superimposing one of said negatives upon the positive corresponding to the other negative, and producing thereby a printing negative, obtaining a print from said printing negative, treating said print with a bath, adapted to cause the silver deposit on the print to assume a color corresponding to color sensations included in the image on the last-named print, of an intensity proportioned to the strength of the deposit, and to affect the emulsion of the print, in proportion to the extent to which it has been exposed to light, and treating the print with a bath adapted to impart a complementary color thereto, in inverse proportion to the extent to which the emulsion thereof has been affected by said first bath, substantially as set forth.

3. In a photographic process, the steps of producing a negative of two or more images from one of which certain color sensations have been omitted and from the other of which certain other color sensations have been omitted, obtaining a positive print from said negative on transparent or translucent material, producing by means of said negative and positive a printing negative each image upon which embodies the color sensations omitted from one or the other of said negative images, and obtaining a print from said printing negative, substantially as set forth.

4. In a photographic process, the steps of producing a negative of two or more images from one of which certain color sensations have been omitted and from the other of which certain other color sensations have been omitted, obtaining a positive print from said negative on transparent or translucent material, combining said negative and positive in such manner that the image upon said negative from which certain color sensations have been omitted shall be superimposed upon that image of the positive from which the other color sensations have been omitted, producing by means of said combined negative and positive a printing negative, and obtaining a print from said printing negative, substantially as set forth.

5. A photographic process involving the production of a negative of two or more images from one of which certain color sensations have been omitted and from the other of which certain other color sensations have been omitted, obtaining a positive print from said negative on transparent or translucent material, combining said negative and positive in such manner that the image upon said negative from which certain color sensations have been omitted shall be superimposed upon that image of the positive from which the other color sensations have been omitted, producing by means of said combined negative and positive a printing negative, obtaining a print from said printing negative, and subjecting the same to the action of a chemical agent, adapted to color the image with an intensity proportioned to the strength of the silver deposit, and to affect the emulsion of the print in proportion to the extent to which it has been exposed to light, and treating the print with a bath adapted to impart another color thereto, in inverse proportion to the extent to which the emulsion thereof has been affected by said chemical agent, substantially as set forth.

6. A photographic process involving the production of a negative of two or more images from one of which certain color sensations have been omitted and from the other of which certain other color sensations have been omitted, obtaining a positive print from said negative on transparent or translucent material, combining said negative and positive in such manner that the image upon said negative from which certain color sensations have been omitted shall be superimposed upon that image of the positive from which the other color sensations have been omitted, producing by means of said combined negative and positive a printing negative, obtaining a print from said printing negative, subjecting the same to the action of different coloring agents, adapted to affect the image and the unchanged emulsion in such manner that a color corresponding to a color sensation contained in the print will be imparted to the print with an intensity proportional to the strength of the silver deposit, and a color corresponding to a color sensation omitted will be imparted to the print, with an intensity inversely proportioned to the extent to which the emulsion has been exposed to light, and reproducing from the negative first named an image superimposed upon a corresponding image upon said print, substantially as set forth.

7. A photographic process involving the production of a negative of two or more images from one of which certain color sensations have been omitted and from the other of which certain other color sensations have been omitted, obtaining a positive print from said negative on transparent or translucent material, combining said negative and positive but displacing the images upon one relatively to those upon the other in such manner that certain images on said negative shall be directly superimposed upon certain images upon said positive, producing by means of said combined negative and positive a printing negative employing only alternate images of said superimposed negative and positive, obtaining a print from said printing negative and subjecting the same to the action of different coloring agents, adapted to affect the image and the unchanged emulsion in such manner that a color corresponding to a color sensation contained in the print will be imparted to the print with an intensity proportional to the strength of the silver deposit, and a color corresponding to a color sensation omitted will be imparted to the print, with an intensity inversely proportioned to the extent to which the emulsion has been exposed to light, substantially as set forth.

8. A photographic process comprising the production of a print having an image thereon, from which the red color sensation has been omitted, treating the silver deposit of the image to turn the same green, of a depth of shade proportional to the strength of the deposit, and to harden the gelatin of the emulsion proportionately as the same has been exposed to light, and treating the print with a red coloring agent which will color the same in inverse proportion to the hardening of the gelatin, substantially as set forth.

9. A photographic process comprising the production of a print having an image thereon, from which the red color sensation has been omitted, treating the silver deposit of the image to turn the same green, of a depth of shade proportional to the strength of the deposit, and to harden the gelatin of the emulsion proportionately as the same has been exposed to light, and treating the print with a red coloring agent which will color the same in inverse proportion to the hardening of the gelatin, and superimposing on the image of the print an image in monochrome from the negative used in the original production of said print, substantially as set forth.

10. A photographic process comprising the production of a print having an image thereon from which the red color sensation has been omitted, toning the print with an acid vanadium chlorid solution, dyeing with an anilin red dye, and superimposing upon the colored image a correcting image in monochrome printed from the negative used in the original production of said print, substantially as set forth.

11. A photographic process comprising the production of two negatives of an object, one through a green filter and the other through a red filter, obtaining a positive print of said second negative, superimposing said first negative on said print, and obtaining a printing negative therefrom, obtaining a print from said printing negative, toning said last-named print with an acid vanadium chlorid solution, and dyeing the same with an anilin red dye, substantially as set forth.

12. A photographic process comprising the production of two negatives of an object, one through a green filter and the other through a red filter, obtaining a positive print of said second negative, superimposing said first negative on said print, and obtaining a printing negative therefrom, obtaining a print from said printing negative, toning said last-named print with an acid vanadium chlorid solution, and dyeing the same with an anilin red dye, re-emulsioning said print and superimposing on the image on said print, but upon said re-emulsioned surface, a monochrome image made by superimposing prints made from the two original negatives, substantially as set forth.

This specification signed and witnessed this 13th day of December, 1913.

WILLIAM F. FOX.

Witnesses:
J. O. EDMONDS,
I. McINTOSH.

vanadium chlorid solution, and dyeing the same with an anilin red dye, re-emulsioning said print and superimposing on the image on said print, but upon said re-emulsioned surface, a monochrome image made by superimposing prints made from the two original negatives, substantially as set forth.

This specification signed and witnessed this 13th day of December, 1913.

WILLIAM F. FOX.

Witnesses:
J. O. EDMONDS,
I. McINTOSH.

---

Correction in Letters Patent No. 1,187,421.

It is hereby certified that in Letters Patent No. 1,187,421, granted June 13, 1916, upon the application of William F. Fox, of New York, N. Y., for an improvement in "Photographic Processes," an error appears in the printed specification requiring correction as follows: Page 1, line 22, for the compound word "consecutive-camera" read *consecutive-view camera;* and that the said Letters Patent should be read with this correction therein that the same may conform to the record of the case in the Patent Office.

Signed and sealed this 25th day of July, A. D., 1916.

[SEAL.]

F. W. H. CLAY,
*Acting Commissioner of Patents.*

Cl. 95—2.

Correction in Letters Patent No. 1,187,421.

It is hereby certified that in Letters Patent No. 1,187,421, granted June 13, 1916, upon the application of William F. Fox, of New York, N. Y., for an improvement in "Photographic Processes," an error appears in the printed specification requiring correction as follows: Page 1, line 22, for the compound word "consecutive-camera" read *consecutive-view camera;* and that the said Letters Patent should be read with this correction therein that the same may conform to the record of the case in the Patent Office.

Signed and sealed this 25th day of July, A. D., 1916.

[SEAL.]
F. W. H. CLAY,
*Acting Commissioner of Patents.*

Cl. 95—2.